Figure 1:
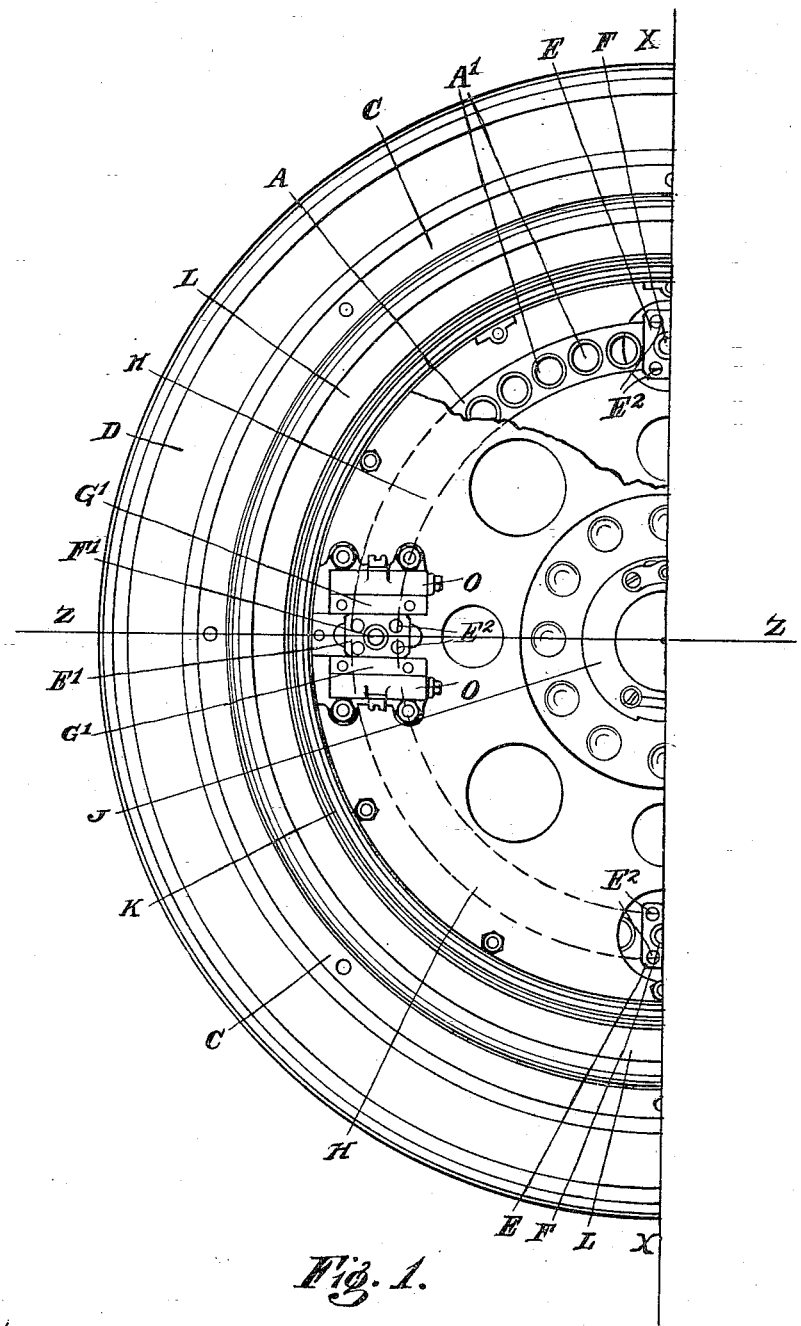

A. ROE.
WHEEL FOR MOTOR AND LIKE VEHICLES.
APPLICATION FILED NOV. 5, 1912.

1,127,285.

Patented Feb. 2, 1915.

A. ROE.
WHEEL FOR MOTOR AND LIKE VEHICLES.
APPLICATION FILED NOV. 5, 1912.

A. ROE.
WHEEL FOR MOTOR AND LIKE VEHICLES.
APPLICATION FILED NOV. 5, 1912.
1,127,285.
Patented Feb. 2, 1915.
4 SHEETS—SHEET 3.
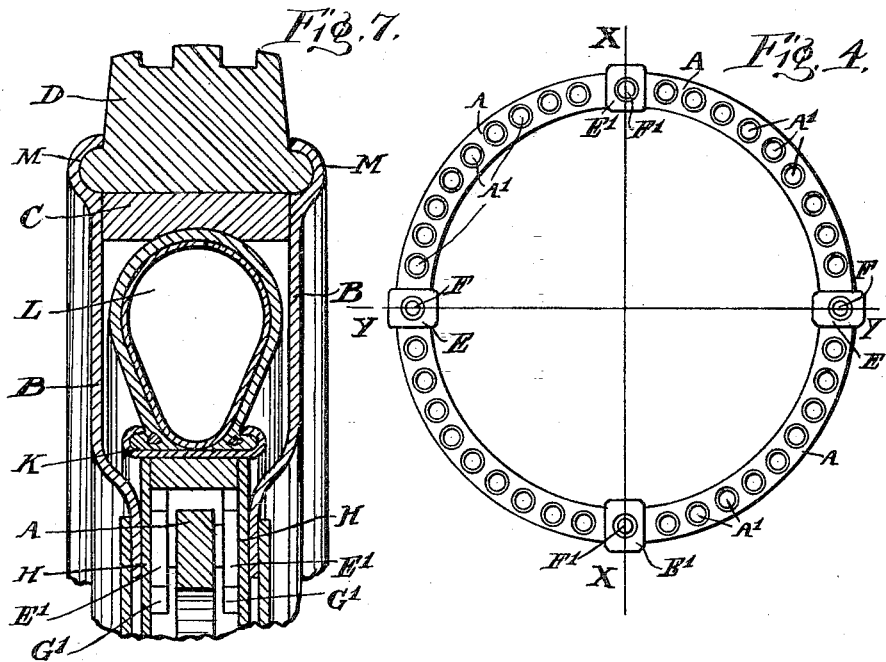
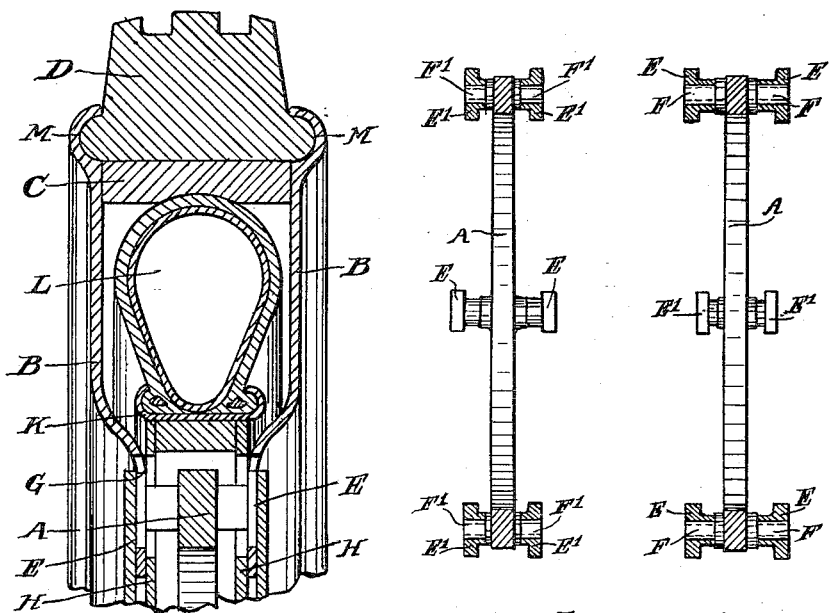

A. ROE.
WHEEL FOR MOTOR AND LIKE VEHICLES.
APPLICATION FILED NOV. 5, 1912.

1,127,285.

Patented Feb. 2, 1915.
4 SHEETS—SHEET 4.

UNITED STATES PATENT OFFICE.

ALFORD ROE, OF ANDOVER, ENGLAND.

WHEEL FOR MOTOR AND LIKE VEHICLES.

1,127,285. Specification of Letters Patent. Patented Feb. 2, 1915.

Application filed November 5, 1912. Serial No. 729,627.

*To all whom it may concern:*

Be it known that I, ALFORD ROE, a subject of the King of Great Britain, and a resident of No. 5 Waterloo Square, Anna Valley, Andover, Hants, England, have invented new and useful Improvements in and Relating to Wheels for Motor and like Vehicles; of which the following is the specification.

This invention relates to improvements in wheels for motor and like vehicles.

The object of my invention is to provide such a construction of wheel combined with means for employing a pneumatic suspension which shall permit of greater resiliency and flexibility than is usual in wheels of this kind, a further object being to provide means for effectively connecting together the outer or tread portion of the wheel and the inner or hub portion in such a manner that while allowing complete resiliency between the two parts, the said means shall transmit the drive of the hub or axle portion to the outer or tread part of the wheel. The said means are so constructed and arranged that any point on the said tread portion of the wheel may slide or move radially from or toward the wheel center, one of the chief objects of the construction being to provide a wheel that will give with a solid rubber or other tread practically the same smoothness of running as is given by the pneumatic tire. To effect this object I provide a floating ring which *per se* is known, which ring enables the two said members of the wheel, to slide relatively and independently of each other, so that while the said point in the sliding outer part may move radially from the wheel center, the diametrically opposite point thereon may move radially toward the said center. The said inner portion to which the hub is secured is therefore adapted to slide radially relatively to the said tread portion of the wheel. The said floating ring is adapted to slidably fit between radial flanges of the outer part and similar flanges of the inner part of the wheel. The radially mounted ring is not secured to either of the said parts, the outer annular casing, or the part secured to the hub, but is slidably connected to each of said parts. The said radially moving floating ring is provided with wide feathers or keys on each side thereof in pairs, two pairs of which feathers, slides, or keys are adapted to fit in slots or guides provided in the outer casing, or some portion of the tread part of the wheel, and two pairs of feathers, slides or keys are provided at 90 degrees apart relatively from the said first two pairs of keys or feathers, which fit in similar slots or guides formed in the other sliding member. I prefer to mount the said feathers or slides on pins or studs fixed in or integrally formed with the floating ring. The pair of feathers or slides mounted upon one such pin or stud has immediately opposite it, *i. e.,* at 180 degrees on the floating ring, a similar pair of similar slides or feathers mounted on a similar pin or pins engaging in guides or featherways in the flanges of the tread portion of the casing, two similar pairs of feathers or slides placed at 90 degrees apart from the before mentioned pairs of feathers or slides engage in featherways or guides in the hub portion of the wheel. It will be observed that the feathers or slides thus arranged at 90 degrees apart, are duplex or in pairs there being a pair at each point of engagement with each member of the wheel, viz., the tread part and the hub part of same. The said floating ring forms the connecting means between the outer portion of the wheel and the inner portion connected to the hub. The said ring while freely adapted to slide radially causes the rotative effort of the hub produced by the driving power to be conveyed from the center portion of the wheel to the outer, thus no driving stress is transmitted through the pneumatic tube.

I so construct the wheel that a pneumatic tube although located in or near the rim or periphery of the wheel shall be so protected as to render it practically impossible to injure it by puncturable means and the like when in use.

I provide on the exterior or periphery of the wheel a rim of suitable construction to carry a solid rubber tire which might conveniently be detachable from the wheel.

I may provide an annular casing within the flange or rim adapted to carry the said solid rubber tire. The said annular casing is preferably formed in two parts suitably bolted or otherwise secured together, and within the said annular casing, which might conveniently be, for example, formed of steel, I mount a rubber tube adapted to be inflated. This rubber tube may be of similar construction, but preferably thicker than that employed in ordinary pneumatic tires. The said annular casing containing the pneumatic tube is not rigidly fixed to the hub of the wheel, but is so constructed that any point on the said annular casing may slide or move radially from the wheel center, while the corresponding opposite point will move radially toward the wheel center. The said annular casing is provided with two annular flanges forming radial inner extensions of the said annular casing.

Suitable means are provided for fitting the inflating valve to the inner tube without affecting the said radial reciprocating movement of the inner and outer members of the wheel.

In the appended sheets of drawings, I illustrate two examples of my invention showing slightly different constructional forms.

Figure 2:
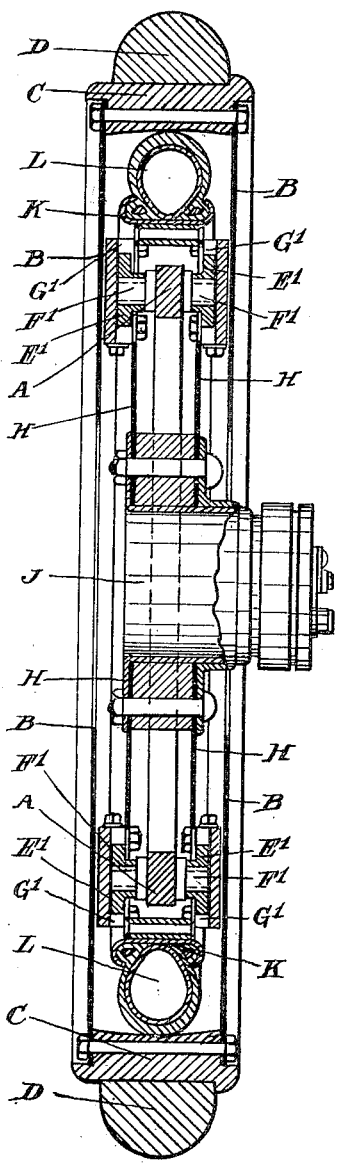
Figure 3:
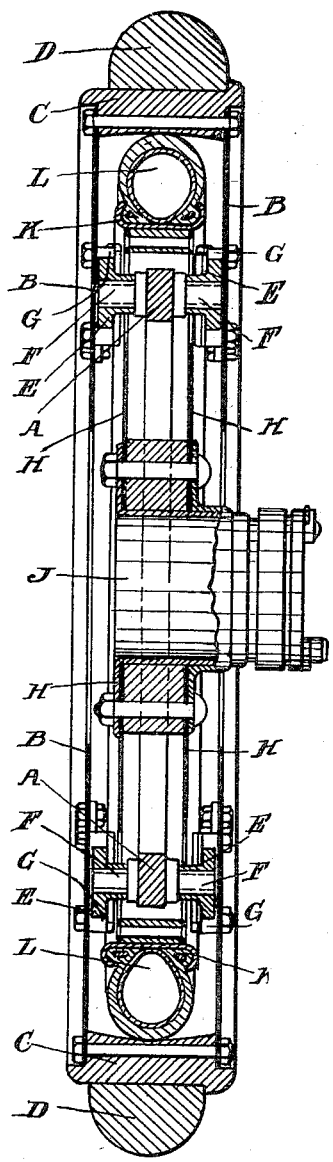
Figure 9:
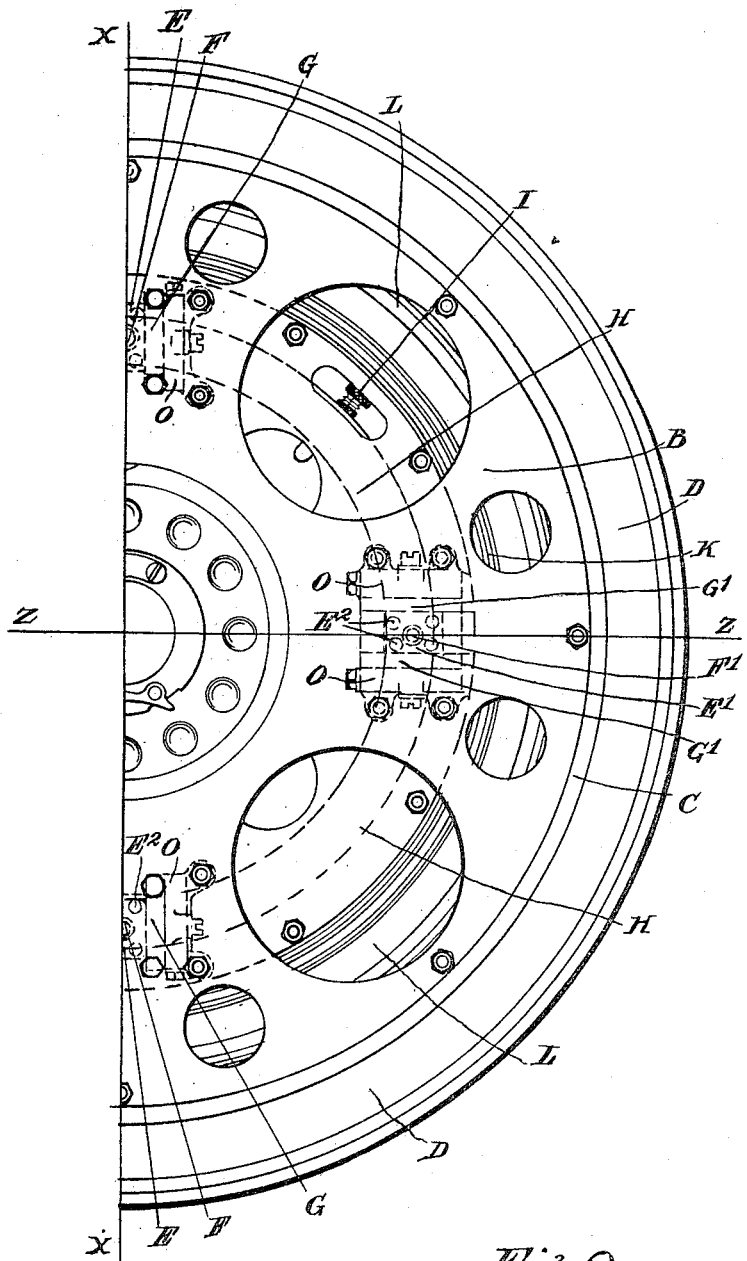

Figure 1 is an elevation of a portion of a wheel with half of the outer disk or casing removed. Fig. 2 is a section on the line Z Z of Fig. 1. Fig. 3 is a section on the line X X of Fig. 1. Fig. 4 is an elevation of a floating ring similar to that shown in Figs. 1, 2 and 3. Fig. 5 is a section of same on the lines X X of Fig. 4. Fig. 6 is a section on the lines Y Y of Fig. 4. Figs 7 and 8 are part sections of a similar arrangement of wheel different in details of construction. Fig. 9 is a view similar to Fig. 1 with the outer disk or casing in place.

Like letters of reference refer to similar parts in each figure.

Referring to Figs. 1, 2 and 3, and to Figs. 4, 5, and 6, A is the floating ring centrally mounted between the side plates or flanges of the wheel. The side plates or flanges B B are rigidly secured to the rim C or tread portion of the wheel, upon which is vulcanized or otherwise suitably secured the solid rubber tire D. The holes made in the side disk plates B are chiefly to lighten them and also to render the floating ring accessible. The floating ring is provided with the feathers, keys or slides E E at diametrically opposite points. The feathers or slides E E are mounted upon pins F which are rigidly secured in or integrally formed with the ring A. The ring A is formed with the holes $A^1$ to lighten same. The feathers or slides E E are of rectangular form and their radial edges are adapted to slide in the guides or featherways G G which are rigidly secured to the insides of the outer disk flanges or plates B B. The outer faces of the slides E E move an easy sliding fit upon the inner surfaces of the plates B B. At 90 degrees apart upon the ring A, and similarly rigidly secured thereto are two pinions $F^1$ $F^1$ somewhat shorter upon which are mounted the two slides or feathers $E^1$ $E^1$. The slides $E^1$ $E^1$ are of similar rectangular form and are adapted to slide radially within the guides $G^1$ $G^1$ which are rigidly secured by bolts to the inner disks H H. At their inner edges the disk plates H H are bolted to the hub J of the wheel and at their outer edges or peripheries are secured to the rim K. The rim K carries the pneumatic tire L secured in known manner thereto. V is the inflating valve. The pneumatic tire rim is thus fixed to the hub portion of the wheel while the solid tire and rim constitute the tread portion in the example of the invention. The holes $E^2$ are formed in the slides E E, $E^1$ $E^1$ to lighten same. O is the receptacle for lubricating oil. When fitted to the vehicle and running on the road, in deforming by pressure the pneumatic tire, the center of the hub portion becomes eccentric relatively to the center of the tread portion, and the slides E E slide radially and vertically in the guides G G, and as the wheel rotates the slides $E^1$ $E^1$ come into the vertical position and slide radially in their guides $G^1$ $G^1$. While the lower slide of the opposite vertical pair therefore moves toward the hub center, the opposite slide will slide away from it. Consequently, while the wheel is running, the center of the hub portion is always eccentric and varyingly eccentric to the tread portion or solid rubber tire in accordance with the load and the impact upon the tread. Moreover the drive of the wheel transmitted from the hub to the tread is transmitted by means of the floating ring which is always sliding radially in the manner described in the two pairs of guides in succession.

Referring to Figs. 7 and 8, the operation of the sliding ring is similar to that described. Fig. 7 shows the attachment of the floating ring A by the slides $E^1$ $E^1$ in the guides $G^1$ $G^1$, on the hub portion of the wheel, and Fig. 8, shows the slides E E in the guides G G on the tread portion of the wheel. In these sections a larger pneumatic tire L is shown, and the solid rubber tire D is secured by the flanges M M in the outer disk plates B B.

What I do claim as my invention and desire to secure by Letters Patent is:—

1. A vehicle wheel including an inner wheel member, and an outer wheel member, both of said members being provided with featherways, cushioning means between said members, a single floating ring provided with diametrically oppositely disposed feathers on both sides thereof, slidably engaging the featherways of one of the wheel members and with diametrically oppositely disposed feathers on both sides thereof at 90° to the first mentioned feathers and slidably engaging the feather ways of the other wheel member.

2. A vehicle wheel including an inner wheel member and an outer tread member, an annular pneumatic cushioning device between said members, pairs of oppositely disposed guide ways arranged at diametrically opposite points on the inner and outer wheel members, the guide ways of one member being arranged at right angles to the guide ways of the other member, a floating ring member having a plurality of pins secured to and projecting from opposite sides thereof to provide pairs of guide pins at opposite sides of the floating ring member, said pairs of guide pins engaging the respective pairs of guide ways of the wheel members, the floating ring member constituting a drive connection between the wheel members permitting radial movement of the wheel members relative to each other.

3. In a vehicle wheel, the combination of an inner wheel member including a hub portion, a rim, and side portions connecting the rim and hub, an outer wheel member including a tire supporting rim and side flange portions extending inwardly from the rim along opposite sides of the rim of the inner wheel member, an annular pneumatic cushioning device between the inner and outer rims, guide channels on the side flanges of the outer wheel member and the opposite side portions of the inner wheel member, said guide channels being arranged in pairs at diametrically opposite points on the side flanges of the outer member and the opposite side portions of the inner wheel member, the pairs of guide channels of the respective members being arranged at right angles to each other, a floating member arranged between the wheel members and provided with portions projecting from opposite sides thereof, said portions slidably engaging the pairs of guide channels of the wheel members, said floating member constituting a drive connection between the wheel members permitting radial movement of the members relative to each other.

ALFORD ROE.

Witnesses:
I. D. KOOTS,
HERBERT D. JAMESON.

Copies of this patent may be obtained for five cents each, by addressing the "Commissioner of Patents, Washington, D. C."